United States Patent
Yang et al.

(10) Patent No.: US 12,236,015 B2
(45) Date of Patent: Feb. 25, 2025

(54) TACTILE FEEDBACK METHOD, TACTILE FEEDBACK APPARATUS AND TOUCH DISPLAY APPARATUS

(71) Applicants: Beijing BOE Technology Development Co., Ltd., Beijing (CN); BOE Technology Group Co., Ltd., Beijing (CN)

(72) Inventors: Zhiming Yang, Beijing (CN); Dexing Qi, Beijing (CN); Yingzi Wang, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/016,259

(22) PCT Filed: Jan. 25, 2022

(86) PCT No.: PCT/CN2022/073855
§ 371 (c)(1),
(2) Date: Jan. 13, 2023

(87) PCT Pub. No.: WO2023/141772
PCT Pub. Date: Aug. 3, 2023

(65) Prior Publication Data
US 2024/0281067 A1    Aug. 22, 2024

(51) Int. Cl.
*G06F 3/01* (2006.01)
*G06F 3/041* (2006.01)

(52) U.S. Cl.
CPC ............ *G06F 3/016* (2013.01); *G06F 3/0416* (2013.01); *G06F 2203/04105* (2013.01)

(58) Field of Classification Search
None
See application file for complete search history.

(56) References Cited

U.S. PATENT DOCUMENTS

| 10,860,110 | B1 * | 12/2020 | Files ...................... G06F 3/016 |
| 2011/0267181 | A1 | 11/2011 | Kildal |
| 2012/0268386 | A1 | 10/2012 | Karamath et al. |
| 2015/0034471 | A1 | 2/2015 | Smith et al. |
| 2017/0168574 | A1 | 6/2017 | Zhang |

FOREIGN PATENT DOCUMENTS

| CN | 102750030 A | 10/2012 |
| CN | 105045498 A | 11/2015 |
| CN | 105446646 A | 3/2016 |

(Continued)

*Primary Examiner* — Joseph R Haley
(74) *Attorney, Agent, or Firm* — IPro, PLLC

(57) ABSTRACT

A tactile feedback method includes: determining a touch state; selecting a fitting waveform corresponding to the touch state according to the touch state; and providing an electrical signal to the tactile feedback apparatus according to the fitting waveform, so as to enable the tactile feedback apparatus to vibrate. A method for obtaining the fitting waveform includes: obtaining a touch simulation mechanical curve, and fitting the touch simulation mechanical curve to obtain the fitting waveform of the electrical signal to be provided to the tactile feedback apparatus.

18 Claims, 7 Drawing Sheets

(56) References Cited

FOREIGN PATENT DOCUMENTS

| | | | |
|---|---|---|---|
| CN | 110347250 | A | 10/2019 |
| CN | 110703952 | A | 1/2020 |
| CN | 111124127 | A | 5/2020 |
| CN | 111897427 | A | 11/2020 |
| JP | 2017129916 | A | 7/2017 |

\* cited by examiner

TACTILE FEEDBACK METHOD, TACTILE FEEDBACK APPARATUS AND TOUCH DISPLAY APPARATUS

CROSS-REFERENCE OF RELATED APPLICATIONS

The present application is a national phase entry under 35 U.S.C. § 371 of International Application No. PCT/CN2022/073855, filed on Jan. 25, 2022.

FIELD

The present disclosure relates to the technical field of display, in particular to a tactile feedback method, a tactile feedback apparatus and a touch display apparatus.

BACKGROUND

With the improvement of user experience requirements, in some application scenarios such as vehicle-mounted display, some key operations cannot be realized by completely relying on vision, and tactile feedback is needed to tell users whether to trigger corresponding commands. However, in existing tactile feedback, specific to virtual buttons, carriers are driven by motors to vibrate basically, a tactile sense is single and visual assistance is needed. It is impossible to judge whether the virtual buttons are touched only from the tactile sense, and the boundary tactile sensation and pressing tactile sensation of the virtual buttons are hardly realized.

SUMMARY

Embodiments of the present disclosure provide a tactile feedback method, applied to a tactile feedback apparatus, including:
  determining a touch state;
  selecting a fitting waveform corresponding to the touch state according to the touch state, wherein a method for obtaining the fitting waveform includes: obtaining a touch simulation mechanical curve, and obtaining the fitting waveform of an electrical signal to be provided to the tactile feedback apparatus by fitting the touch simulation mechanical curve; and
  providing the electrical signal to the tactile feedback apparatus according to the fitting waveform to enable the tactile feedback apparatus to vibrate.

In some embodiments, the fitting waveform includes a boundary tactile sense waveform. The obtaining the touch simulation mechanical curve includes:
  obtaining, according to a preset boundary model, a touch simulation positive force changing curve as a touch simulation mechanical curve.

The obtaining the fitting waveform of the electrical signal to be provided to the tactile feedback apparatus by fitting the touch simulation mechanical curve includes:
  obtaining the boundary tactile sense waveform by fitting the touch simulation positive force changing curve.

In some embodiments, the boundary tactile sense waveform includes a boundary waveform corresponding to the touch simulation positive force changing curve, and a reverse stopping waveform behind the boundary waveform.

A phase of the reverse stopping waveform is opposite to a phase of the boundary waveform.

In some embodiments, a frequency of the boundary waveform is greater than or equal to 200 Hertz and less than or equal to 800 Hertz.

In some embodiments, the method for obtaining the fitting waveform further includes:
  obtaining acceleration changing data of a touch interface of the tactile feedback apparatus through acceleration test on the tactile feedback apparatus.

The obtaining the boundary tactile sense waveform by fitting the touch simulation positive force changing curve includes:
  obtaining the boundary tactile sense waveform by fitting the touch simulation mechanical curve and the acceleration changing data.

In some embodiments, the boundary tactile sense waveform further includes an overdrive waveform prior to the boundary waveform and corresponding to the acceleration changing data; and a frequency of the overdrive waveform is greater than the frequency of the boundary waveform.

In some embodiments, the frequency of the overdrive waveform is greater than or equal to 2000 Hertz and less than or equal to 6000 Hertz.

In some embodiments, a duration of the overdrive waveform is greater than 0 and less than or equal to 5 milliseconds, a duration of the boundary waveform is greater than or equal to 10 milliseconds and less than or equal to 30 milliseconds, and a duration of the reverse stopping waveform is greater than or equal to 1 millisecond and less than or equal to 5 milliseconds.

In some embodiments, a voltage of the boundary tactile sense waveform is greater than or equal to −200 volts and less than or equal to 200 volts.

In some embodiments, the fitting waveform further includes a press tactile sense waveform. The obtaining the touch simulation mechanical curve includes:
  obtaining a simulated contact force changing curve in a touch press process to serve as the touch simulation mechanical curve.

The obtaining the fitting waveform of the electrical signal to be provided to the tactile feedback apparatus by fitting the touch simulation mechanical curve includes:
  obtaining the press tactile sense waveform by fitting the contact force changing curve.

In some embodiments, the press tactile sense waveform includes a first press waveform, a keeping waveform behind the first press waveform and a second press waveform behind the keeping waveform.

a voltage amplitude of the first press waveform is greater than a voltage amplitude of the second press waveform.

In some embodiments, the number of duration periods of the first press waveform is greater than or equal to 30 and less than or equal to 50, a duration of the keeping waveform is greater than or equal to 60 milliseconds and less than or equal to 200 milliseconds, and the number of duration periods of the second press waveform is greater than or equal to 5 and less than or equal to 20.

In some embodiments, the determining the touch state includes:
  determining a touch position.

The selecting the fitting waveform corresponding to the touch state according to the touch state includes:
  when the touch position falls into a first preset area, selecting the boundary tactile sense waveform as the fitting waveform; and
  when the touch position falls into a second preset area, selecting the press tactile sense waveform as the fitting waveform.

In some embodiments, the determining the touch state includes:
  determining a touch position; and when the touch position falls into a third preset area, determining touch pressure.

The selecting the fitting waveform corresponding to the touch state according to the touch state includes:
when the touch pressure is less than preset pressure, selecting the boundary tactile sense waveform as the fitting waveform; and
when the touch pressure is greater than or equal to the preset pressure, selecting the press tactile sense waveform as the fitting waveform.

A tactile feedback apparatus provided by embodiments of the present disclosure includes:
a touch panel, including a touch substrate and at least one piezoelectric device located on one side of the touch substrate; and
a drive chip, configured to provide an electrical signal to the piezoelectric device according to the tactile feedback method provided by the embodiments of the present disclosure.

A touch display apparatus, including the tactile feedback apparatus provided by the embodiments of the present disclosure.

BRIEF DESCRIPTION OF THE DRAWINGS

In order to illustrate the technical solutions in the embodiments of the present disclosure more clearly, a brief description of the accompanying drawings required for use in the description of the embodiments is given below. Obviously, the accompanying drawings described below are only some embodiments of the present disclosure, for those ordinary skills in the art, other accompanying drawings can be obtained from these accompanying drawings without any creative effort.

DETAILED DESCRIPTION OF THE EMBODIMENTS

Figure 1:
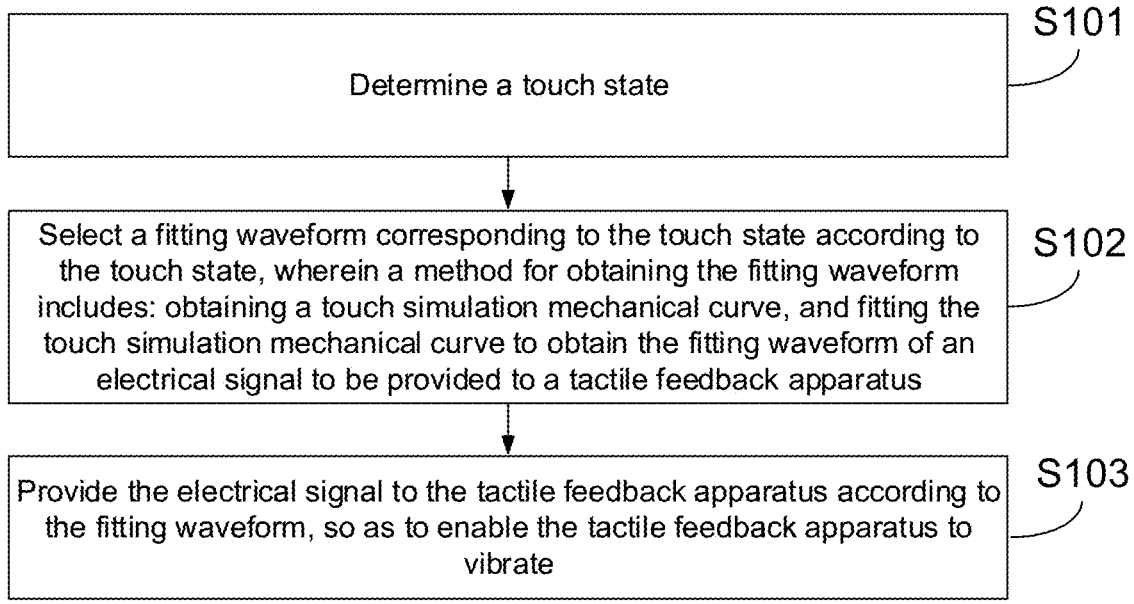
FIG. 1 is a flow schematic diagram of a tactile feedback method provided by an embodiment of the present disclosure.

In order to enable objectives, technical solutions and advantages of the embodiments of the present disclosure more clearly, the technical solutions of the embodiments of the present disclosure will be described clearly and completely in combination with accompanying drawings of the embodiments of the present disclosure below: Apparently, the described embodiments are only a part of the embodiments of the present disclosure, not all of the embodiments. In addition, the embodiments of the present disclosure and features in the embodiments may be combined with each other without conflict. Based on the described embodiments of the present disclosure, all other embodiments obtained by those of ordinary skill in the art without creative work shall fall within the protection scope of the present disclosure.

Unless otherwise defined, technical or scientific terms used in the present disclosure shall have the ordinary meanings understood by those of ordinary skill in the art to which the present disclosure pertains. The words "first", "second" and the like used in the present disclosure do not represent any sequence, quantity or importance, but are used to distinguish different constituent parts. The words "include" or "comprise" and the like indicate that an element or item appearing before such word covers listed elements or items appearing after the word and equivalents thereof, and does not exclude other elements or items. The words "connect" or "link" and the like are not limited to physical or mechanical connection, but may include electrical connection, whether direct or indirect.

It should be noted that the size and the shape of each figure in the accompanying drawings do not reflect a true scale, and are merely intended to illustrate contents of the present disclosure. In addition, the same or similar reference numerals indicate the same or similar components or components having the same or similar functions all the time.

Embodiments of the present disclosure provide a tactile feedback method, applied to a tactile feedback apparatus, and as shown in FIG. 1, the tactile feedback method includes:

S101, a touch state is determined;

S102, a fitting waveform corresponding to the touch state is selected according to the touch state, wherein a method for obtaining a fitting waveform includes: obtaining a touch simulation mechanical curve; and obtaining the fitting waveform of an electrical signal applied to the tactile feedback apparatus by fitting the touch simulation mechanical curve; and S103, the electrical signal is provided to the tactile feedback apparatus according to the fitting waveform, so as to enable the tactile feedback apparatus to vibrate.

According to the tactile feedback method provided by the embodiments of the present disclosure, mechanical simulation(s) is/are performed on a touch behavior(s) in advance to obtain the touch simulation mechanical curve(s), and the fitting waveform(s) corresponding to the touch simulation mechanical curve(s) is/are obtained by fitting the touch simulation mechanical curve(s) obtained through simulation to serve as signal(s) applied to the tactile feedback apparatus. After the fitting waveform corresponding to the touch state is selected according to the touch state, the electrical signal is provided to the tactile feedback apparatus according to the selected fitting waveform, so as to enable the tactile feedback apparatus to vibrate to simulate a true tactile sense, so that a user experiences a tactile sense corresponding to the touch behavior, a virtual tactile sense corresponding to the touch behavior is provided for the user, and the user experience is improved.

During implementations, the tactile feedback apparatus includes a piezoelectric device, an electrical signal is provided to the piezoelectric device according to the fitting waveform, and thus the piezoelectric device vibrates to generate a tactile sense corresponding to the fitting waveform.

It should be illustrated that the touch state includes, for example, a touch position where the touch occurs in the tactile feedback apparatus and touch pressure.

In some embodiments, the fitting waveform includes a boundary tactile sense waveform. The obtaining the touch simulation mechanical curve includes:
the touch simulation positive force changing curve is obtained according to the preset boundary model to serve as the touch simulation mechanical curve.

The fitting the touch simulation mechanical curve to obtain the fitting waveform of the electrical signal applied to the tactile feedback apparatus includes:
the touch simulation positive force changing curve is fit to obtain the boundary tactile sense waveform.

It should be noted that the boundary tactile sense refers to that for a real button edge, such as a raised button, the boundary sense will generate when a finger slides across the button from left to right.

According to the tactile feedback method provided by the embodiments of the present disclosure, when the fitting waveform needs to include the boundary tactile sense waveform, mechanical simulation(s) is/are performed on the touch behavior(s) according to the preset boundary model in advance to obtain the touch simulation positive force changing curve(s), and the boundary tactile waveform(s) is/are obtained by fitting the touch simulation positive force changing curve(s) obtained through simulation to serve as the signal(s) applied to the tactile feedback apparatus. After the boundary tactile sense waveform is selected according to the touch state to serve as the fitting waveform, the electrical signal corresponding to the boundary tactile sense waveform is provided to the tactile feedback apparatus, so as to enable the tactile feedback apparatus to vibrate to simulate a boundary tactile sense, so that the user experiences the boundary tactile sense corresponding to a touch entity button, and the user experience is improved.

Figure 4:
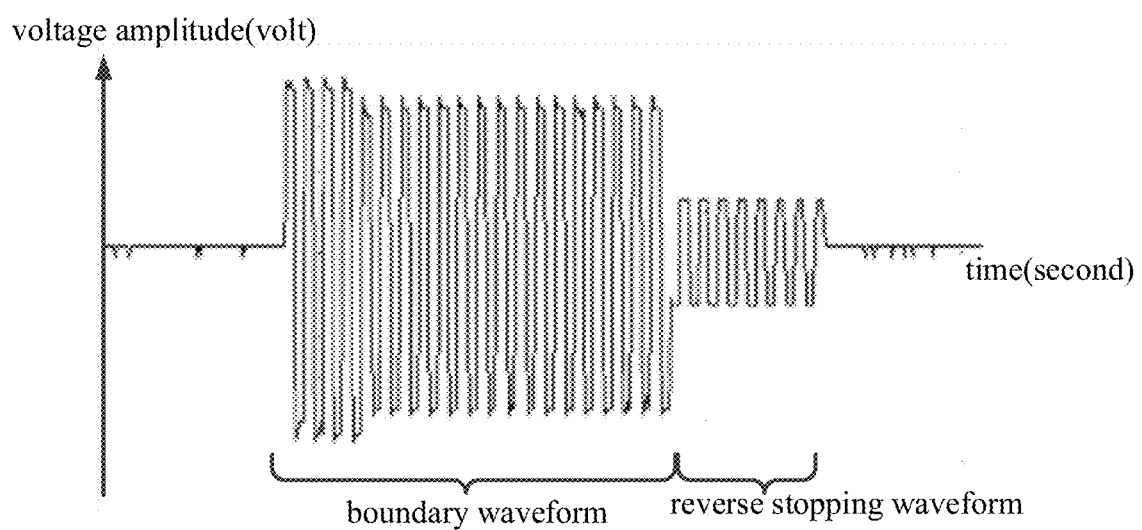
FIG. 4 is a schematic diagram of a fitting waveform provided by an embodiment of the present disclosure.

In some embodiments, as shown in FIG. 4, the boundary tactile sense waveform includes a boundary waveform corresponding to the touch simulation positive force changing curve and a reverse stopping waveform behind the boundary waveform.

A phase of the reverse stopping waveform is opposite to a phase of the boundary waveform.

According to the tactile feedback method provided by the embodiments of the present disclosure, the boundary tactile sense waveform includes the boundary waveform and the reverse stopping waveform. The boundary waveform is used for generating the boundary tactile sense, and the reverse stopping waveform can stop vibration of the tactile feedback apparatus more quickly, so that the user experiences the sharper boundary tactile sense, the boundary tactile sense generated through the vibration of the tactile feedback apparatus is closer to a real button boundary tactile sense, and the user experience is further improved.

During implementations, when mechanical simulation is performed on a touch behavior, and when simulation parameters such as a touch duration are the same, morphologies of the touch simulation positive force changing curve obtained through different boundary models are different, and the fitting waveforms obtained subsequently are also different.

Figure 2:
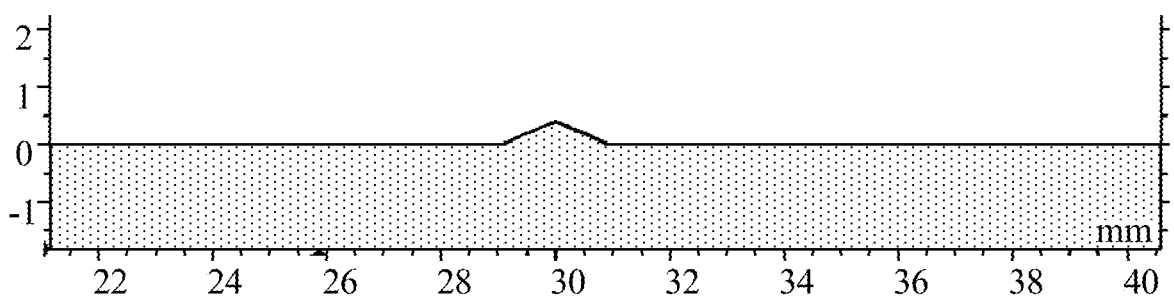
FIG. 2 is a schematic diagram of a boundary model provided by an embodiment of the present disclosure.

Next, taking the boundary model shown in FIG. 2 as an example for illustration, the boundary model shown in FIG. 2 is a boundary model with bulge on a plane.

Figure 3:
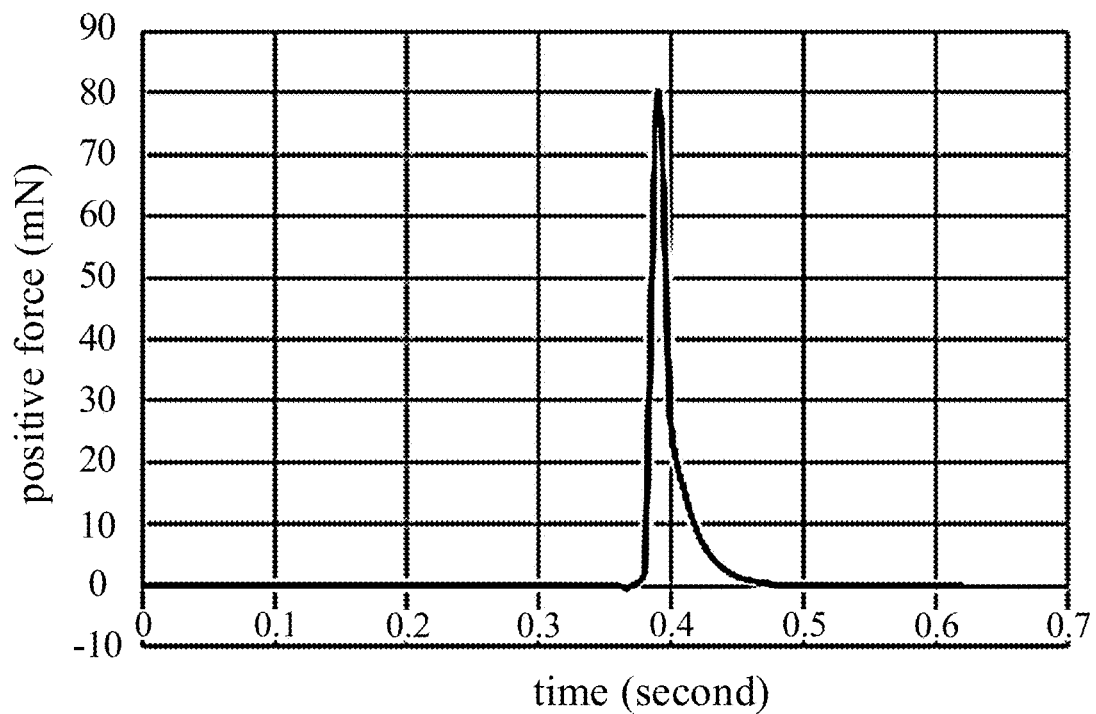
FIG. 3 is a schematic diagram of a touch simulation positive force changing curve provided by an embodiment of the present disclosure.

FIG. 3 is the touch simulation positive force changing curve obtained through simulation on the touch behavior according to the boundary model shown in FIG. 2, and FIG. 4 is the fitting waveform obtained by fitting the touch simulation positive force changing curve shown in FIG. 3. During implementations, a square wave and a sine wave are adopted to fit the touch simulation positive force changing curve shown in FIG. 3 to obtain the fitting waveform.

In some embodiments, a frequency of the boundary waveform is greater than or equal to 200 Hertz and less than or equal to 800 Hertz, and a voltage of the boundary tactile sense waveform is greater than or equal to −200 volts and less than or equal to 200 volts.

Figure 5:
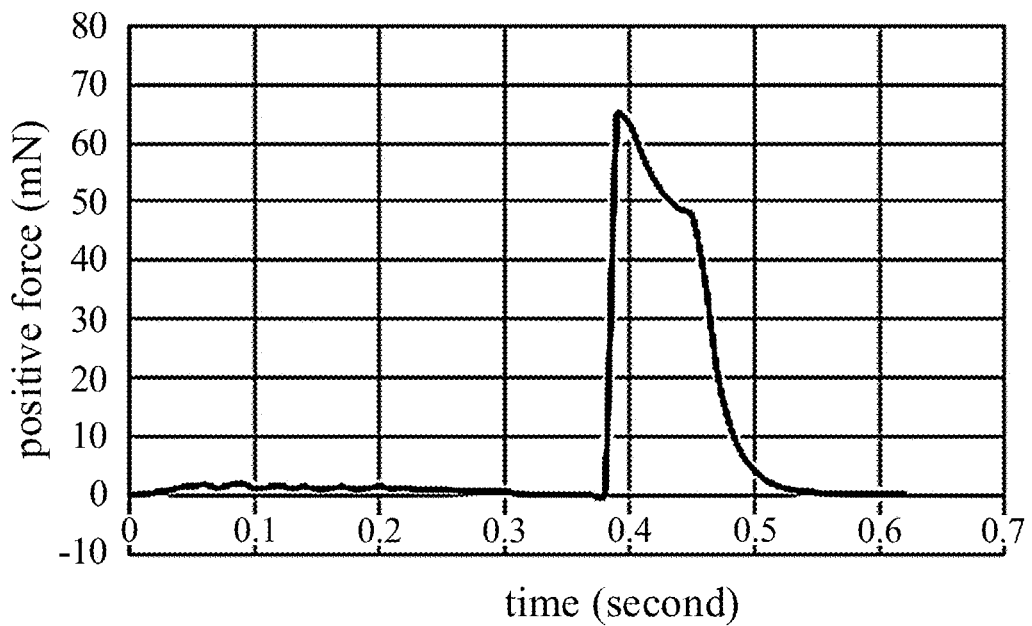
FIG. 5 is a schematic diagram of another touch simulation positive force changing curve provided by an embodiment of the present disclosure.
Figure 6:
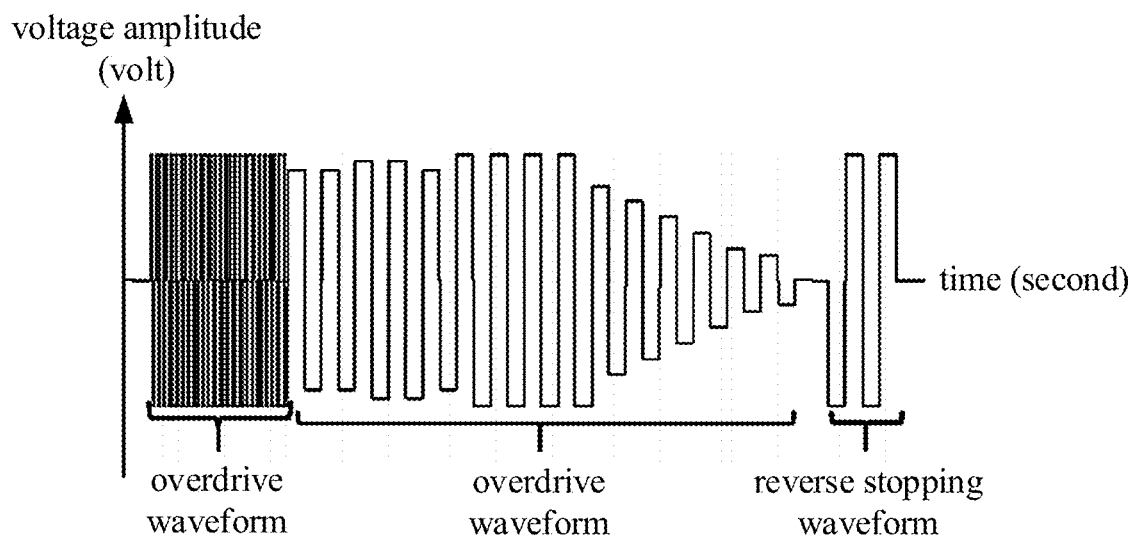
FIG. 6 is a schematic diagram of another fitting waveform provided by an embodiment of the present disclosure.

FIG. 5 is the touch simulation positive force changing curve obtained through simulation on the touch behavior according to the boundary model shown in FIG. 2, and compared with FIG. 3, when the touch behavior is simulated, touch time of the touch behavior is increased. FIG. 6 is the fitting waveform obtained by fitting the touch simulation positive force changing curve shown in FIG. 5. During implementations, the square wave is adopted to fit the touch simulation positive force changing curve shown in FIG. 5 to obtain the fitting waveform.

In some embodiments, the method for obtaining the fitting waveform further includes:
acceleration test is performed on the tactile feedback apparatus to obtain acceleration changing data of a touch interface of the tactile feedback apparatus.

The fitting the touch simulation positive force changing curve to obtain the boundary tactile sense waveform includes:
the touch simulation mechanical curve and the acceleration changing data are fit to obtain the boundary tactile sense waveform.

It should be illustrated that an accelerometer may be used to test the acceleration changing data of the touch interface of the tactile feedback apparatus. During implementations, for example, acceleration changing data of fingers touching the touch interface of the tactile feedback apparatus may be tested. The touch simulation mechanical curve and the acceleration changing data are fit, and the boundary tactile sense waveform corresponding to the touch simulation mechanical curve and the acceleration changing data may be provided to the tactile feedback apparatus, so that the tactile sense generated through vibration of the tactile feedback apparatus is closer to the real tactile sense, and the user experience is further improved.

In some embodiments, as shown in FIG. 6, the boundary tactile sense waveform further includes an overdrive waveform prior to the boundary waveform and corresponding to the acceleration changing data. A frequency of the overdrive waveform is greater than a frequency of the boundary waveform.

In some embodiments, when the boundary tactile sense waveform includes the overdrive waveform, the boundary waveform and the reverse stopping waveform, the frequency of the boundary waveform is greater than or equal to 200 Hertz and less than or equal to 800 Hertz, the frequency of the overdrive waveform is greater than or equal to 2000 Hertz and less than or equal to 6000 Hertz, and a voltage of the boundary tactile sense waveform is greater than or equal to −200 volts and less than or equal to 200 volts.

In some embodiments, a duration of the overdrive waveform is greater than 0 and less than or equal to 5 milliseconds, a duration of the boundary waveform is greater than or equal to 10 milliseconds and less than or equal to 30 milliseconds, and a duration of the reverse stopping waveform is greater than or equal to 1 millisecond and less than or equal to 5 milliseconds.

Figure 7:
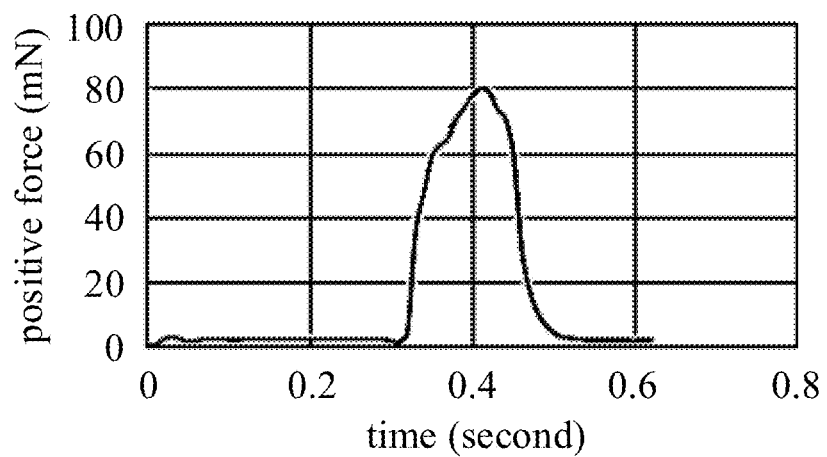
FIG. 7 is a schematic diagram of yet another touch simulation positive force changing curve provided by an embodiment of the present disclosure.
Figure 8:
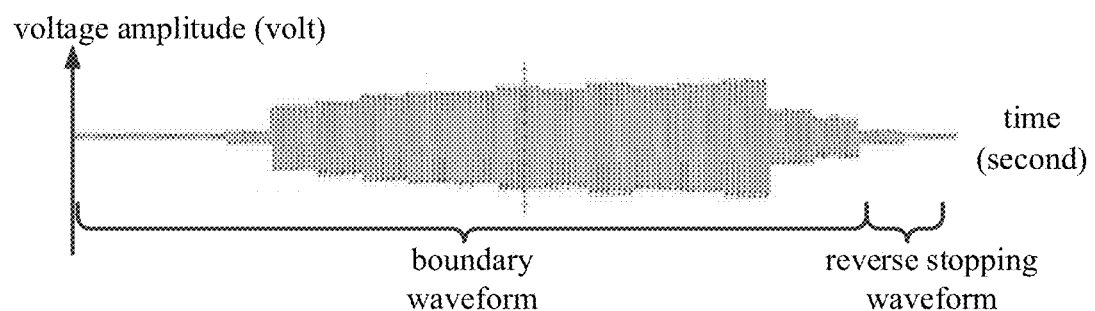
FIG. 8 is a schematic diagram of yet another fitting waveform provided by an embodiment of the present disclosure.

During implementations, the touch behavior is simulated, and contact time of the touch process can be set according to practical requirements such as application scenes of the tactile feedback apparatus. For example, FIG. 7 is the touch simulation positive force changing curve obtained through simulation on the touch behavior according to the boundary model shown in FIG. 2, and compared with FIG. 5, when the touch behavior is simulated, the contact time of the touch behavior is prolonged. FIG. 8 is the fitting waveform obtained by fitting the touch simulation positive force changing curve shown in FIG. 5. During implementations, a square wave and a sine wave are adopted to fit the touch simulation positive force changing curve shown in FIG. 7 to obtain the fitting waveform. It should be illustrated that the fitting waveform shown in FIG. 8 includes the boundary waveform and the reverse stopping waveform.

Figure 9:
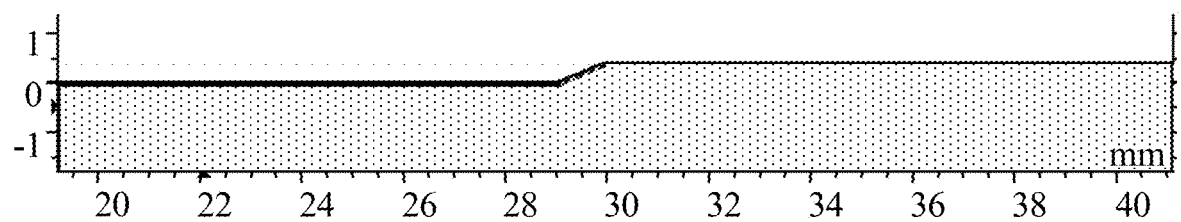
FIG. 9 is a schematic diagram of another boundary model provided by an embodiment of the present disclosure.
Figure 10:
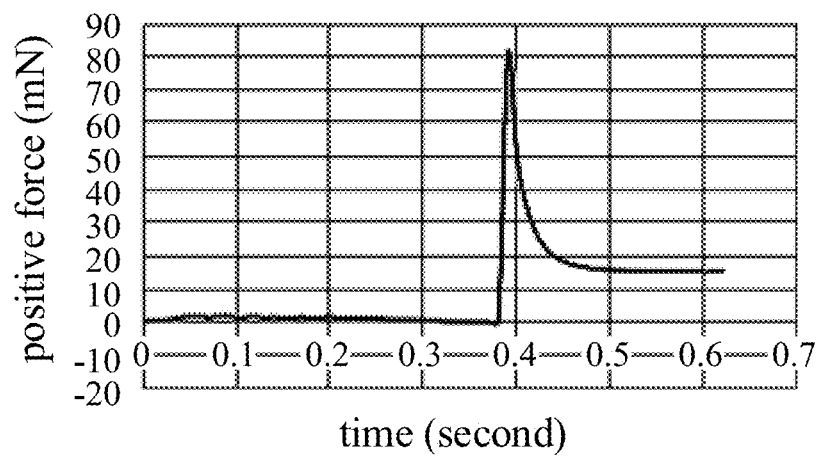
FIG. 10 is a schematic diagram of yet another touch simulation positive force changing curve provided by an embodiment of the present disclosure.
Figure 11:
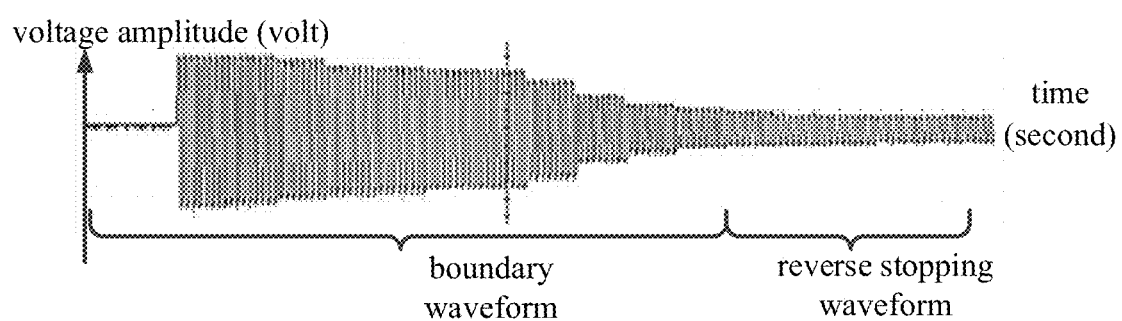
FIG. 11 is a schematic diagram of yet another fitting waveform provided by an embodiment of the present disclosure.

Certainly, during implementations, other boundary models may further be adopted to simulate the touch behavior. For example, the boundary model shown in FIG. 9 may be adopted to simulate the touch behavior. The boundary model shown in FIG. 9 is a step-type boundary model, and the step represents a boundary from one plane to another plane. FIG. 10 is the touch simulation positive force changing curve obtained through simulation on the touch behavior according to the boundary model shown in FIG. 9. FIG. 11 is the fitting waveform obtained by fitting the touch simulation positive force changing curve shown in FIG. 10. During implementations, a square wave and a sine wave may be adopted to fit the touch simulation positive force changing curve shown in FIG. 10. The fitting waveform shown in FIG. 11 includes the boundary waveform and the reverse stopping waveform.

In some embodiments, the fitting waveform further includes a press tactile sense waveform. The obtaining the touch simulation mechanical curve includes:
a simulated contact force changing curve in the touch press process is obtained to serve as a touch simulation mechanical curve.

The fitting the touch simulation mechanical curve to obtain the fitting waveform of an electrical signal applied to the tactile feedback apparatus includes:
the contact force changing curve is fit to obtain a press tactile sense waveform.

Figure 12:
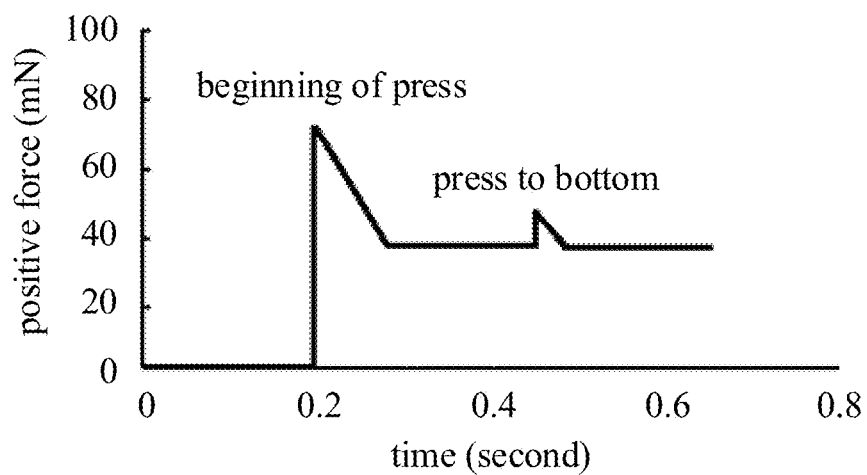
FIG. 12 is a schematic diagram of a touch force changing curve provided by an embodiment of the present disclosure.

During implementations, for example, the simulated contact force changing curve in the touch press process is shown in FIG. 12. The magnitude of positive force at the beginning of the press process is different from that of positive force when pressing to the bottom. A period of constant positive force exists between the beginning of press and the press to the bottom. The touch simulation mechanical curve shown in FIG. 12 is fit to obtain the fitting waveform shown in FIG. 13.

Figure 13:
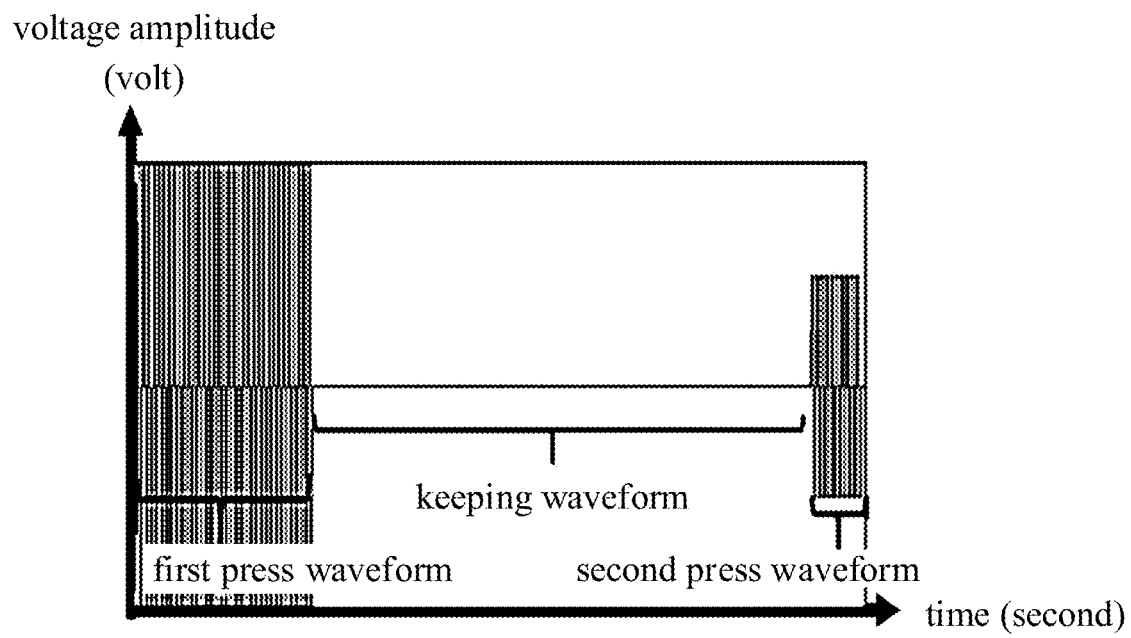
FIG. 13 is a schematic diagram of yet another fitting waveform provided by an embodiment of the present disclosure.

In some embodiments, as shown in FIG. 13, the press tactile sense waveform includes a first press waveform, a keeping waveform behind the first press waveform and a second press waveform behind the keeping waveform.

A voltage amplitude of the first press waveform is greater than a voltage amplitude of the second press waveform.

It should be illustrated that the first press waveform corresponds to a stage of beginning press, the keeping waveform corresponds to a stage that press pressure is not changed after the touch press begins, and the second press waveform corresponds to a stage of the press to the bottom.

In some embodiments, a frequency of the press tactile sense waveform is greater than or equal to 200 Hertz and less than or equal to 900 Hertz.

In some embodiments, the number of duration periods of the first press waveform is greater than or equal to 30 and less than or equal to 50, a duration of the keeping waveform is greater than or equal to 60 milliseconds and less than or equal to 200 milliseconds, and the number of duration periods of the second press waveform is greater than or equal to 5 and less than or equal to 20.

In some embodiments, the determining the touch state includes:
a touch position is determined.

The selecting the fitting waveform corresponding to the touch state according to the touch state includes:
when the touch position falls into a first preset area, the boundary tactile sense waveform is selected as the fitting waveform;
when the touch position falls into a second preset area, the press tactile sense waveform is selected as the fitting waveform.

In some embodiments, a center of a virtual key-pressing area of the tactile feedback apparatus falls into the second preset area, and the second preset area is located in the virtual key-pressing area. That is, the second preset area corresponds to the center area of the virtual key-pressing area. When touch occurs in the center area of the virtual key-pressing area, the press tactile sense waveform is selected as the fitting waveform.

In some embodiments, the first preset area surrounds the second preset area, and the first preset area is adjacent to the second preset area. That is, the first preset area corresponds to an edge of the virtual key-pressing area. In some embodiments, an area formed by the first preset area and the second preset area may be the virtual key-pressing area. When touch occurs in the edge of the virtual key-pressing area, the boundary tactile sense waveform is selected as the fitting waveform. Certainly, in some embodiments, the virtual key-pressing area may partially overlap with the first preset area. That is, the first preset area includes not only the edge of the virtual key-pressing area, but also an area adjacent to the edge of the virtual key-pressing area. When touch occurs in the edge of the virtual key-pressing area and nearby areas, the boundary tactile sense waveform is selected as the fitting waveform, so that when the user's finger touches from the area near the edge of the virtual key-pressing area to the edge of the virtual key-pressing area, the boundary tactile sense is simulated.

Alternatively, in some embodiments, the determining the touch state includes:
a touch position is determined; and
when the touch position falls into a third preset area, touch pressure is determined.

The selecting the fitting waveform corresponding to the touch state according to the touch state includes:

when the touch pressure is less than preset pressure, the boundary tactile sense waveform is selected as the fitting waveform;

when the touch pressure is greater than or equal to the preset pressure, the press tactile sense waveform is selected as the fitting waveform.

During implementations, for example, the third preset area is the virtual key-pressing area. That is, when touch occurs in the virtual key-pressing area, the touch pressure is determined.

During implementations, when the touch pressure is less than the preset pressure, the current touch state is considered as a non-press state, and thus the boundary tactile sense waveform is selected as the fitting waveform to feed back the boundary tactile sense. When the touch pressure is greater than or equal to the preset pressure, the current touch state is considered as a press state, and thus the press tactile sense waveform is selected as the fitting waveform to feed back the press tactile sense.

Figure 14:
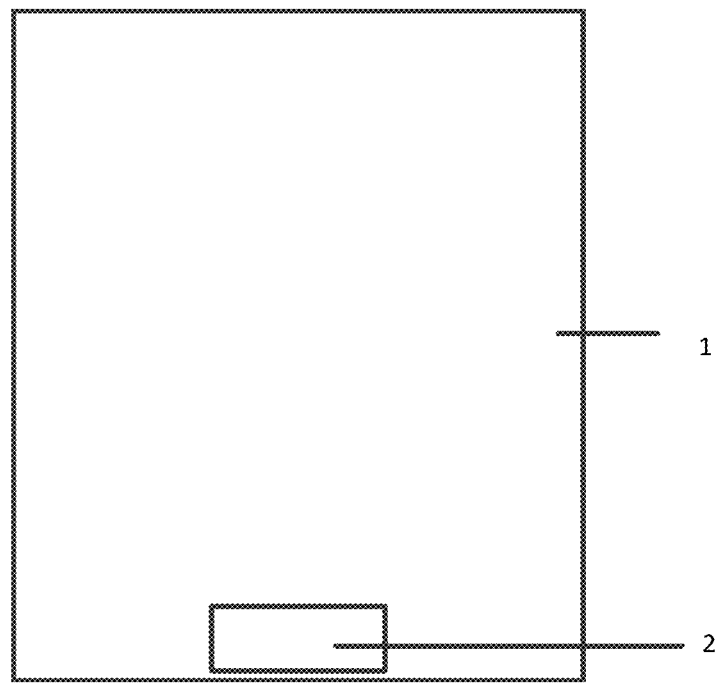
FIG. 14 is a structural schematic diagram of a tactile feedback apparatus provided by an embodiment of the present disclosure.
Figure 15:
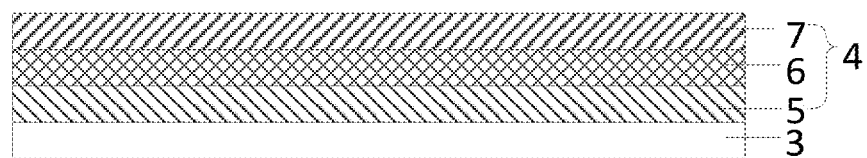
FIG. 15 is a structural schematic diagram of a touch panel provided by an embodiment of the present disclosure.

A tactile feedback apparatus provided by embodiments of the present disclosure, as shown in FIG. 14, includes:

a touch panel 1, as shown in FIG. 15, including a touch substrate 3 and at least one piezoelectric device 4 located on one side of the touch substrate; and a drive chip 2, configured to provide an electrical signal to the piezoelectric device according to the tactile feedback method provided by the embodiments of the present disclosure.

During implementations, the drive chip is electrically connected with the piezoelectric device, and the electrical signal provided by the drive chip to the piezoelectric device is an alternating current signal. The piezoelectric device is used for vibrating under the action of an alternating electric field of different resonant frequencies and driving the touch substrate to vibrate.

In some embodiments, the touch panel includes at least one virtual key-pressing area, the piezoelectric device may be arranged in the virtual key-pressing area, and each virtual key-pressing area includes at least one piezoelectric device.

During implementations, as shown in FIG. 15, the piezoelectric device 4 includes a first electrode 5, a piezoelectric layer 6 and a second electrode 7 which are sequentially stacked on one side of the touch substrate 3. In some embodiments, for example, the first electrode is grounded, and the second electrode is electrically connected with the drive chip. The first electrode and the second electrode are configured to form an alternating electric field, and the piezoelectric layer is configured to vibrate under the action of the alternating electric field and drive the touch substrate to vibrate.

During implementations, the drive chip stores the fitting waveforms. The fitting waveforms include at least one boundary tactile sense waveform and at least one press tactile sense waveform.

In some embodiments, the tactile feedback apparatus further includes a touch module, and the touch module is located on one side, facing away from a touch surface, of the touch panel. The touch module includes, for example, a plurality of touch induction electrodes and a plurality of touch drive electrodes.

During implementations, the drive chip receives a signal fed back by the touch module to determine the touch position, selects the fitting waveform corresponding to the touch state according to the touch position, and provides the electrical signal to the piezoelectric device according to the fitting waveform.

During implementations, the drive chip receives the signal fed back by the touch module to determine the touch position.

When the touch position falls into the first preset area, the drive chip selects the boundary tactile sense waveform as the fitting waveform, and provides the electrical signal to the piezoelectric device according to the boundary tactile sense waveform.

When the touch position falls into the second preset area, the drive chip selects the press tactile sense waveform as the fitting waveform, and provides the electrical signal to the piezoelectric device according to the press tactile sense waveform.

In some embodiments, the drive chip may further determine the touch pressure by using the signal fed back by the piezoelectric device. That is, a direct piezoelectric effect of the piezoelectric device may be used, i.e., when the piezoelectric layer is subjected to external force, an electric polarization phenomenon generates internally, and electrical charges with opposite signs are generated on the first electrode and the second electrode; and the quantity of the electrical charges generated by the force on the piezoelectric layer is proportional to the amount of the external force. The drive chip receives the signal fed back by the piezoelectric device to determine the magnitude of pressure.

During implementations, when the touch position falls into the third preset area, the drive chip receives the signal fed back by the piezoelectric device to determine the touch pressure. When the touch pressure is less than the preset pressure, the drive chip selects the boundary tactile sense waveform as the fitting waveform, and provides the electrical signal to the piezoelectric device according to the boundary tactile sense waveform. When the touch pressure is greater than or equal to the preset pressure, the drive chip selects the press tactile sense waveform as the fitting waveform, and provides the electrical signal to the piezoelectric device according to the press tactile sense waveform.

A touch display apparatus provided by embodiments of the present disclosure includes the tactile feedback apparatus provided by the embodiments of the present disclosure.

The touch display apparatus provided by the embodiments of the present disclosure is a mobile phone, a tablet personnel computer, a television, a display, a notebook computer, a digital photo frame, a navigator and any products or components with a touch display function. Other essential components of the touch display apparatus should be understood by those ordinarily skilled in the art, which is not repeated here, and should not be taken as a limitation to the present disclosure. The implementations of the display apparatus may refer to the embodiments of the above tactile feedback apparatus, and repetitions are not repeated here.

In conclusion, according to the tactile feedback method, the tactile feedback apparatus and the touch display apparatus provided by the embodiments of the present disclosure, mechanical simulation is performed on the touch behavior in advance to obtain the touch simulation mechanical curve, and the fitting waveform corresponding to the touch simulation mechanical curve is obtained by fitting the touch simulation mechanical curve obtained through simulation to serve as the signal applied to the touch display apparatus; and after the fitting waveform corresponding to the touch state is selected according to the touch state, the electrical signal is provided to the tactile feedback apparatus according to the selected fitting waveform, so as to enable the tactile feedback apparatus to vibrate to simulate the real tactile sense, so that the user experiences the tactile sense corresponding to the touch behavior, the virtual tactile sense corresponding to the touch behavior is provided to the user, and the user experience is improved.

Although the preferred embodiments of the present disclosure have been described, additional changes and modifications may be made to these embodiments once the basic creative concepts are known to those skilled in the art. Therefore, the appended claims are intended to include the preferred embodiments and all changes and modifications falling within the scope of the present disclosure.

It will be apparent to those skilled in the art that various changes and modifications may be made to the present disclosure without departing from the spirit or scope of the present disclosure. In this way, if these changes and modifications of the present disclosure fall within the scope of the claims of the present disclosure and their equivalent art, the present disclosure also intends to include these changes and modifications.

What is claimed is:

1. A tactile feedback method, applied to a tactile feedback apparatus, comprising:
   determining a touch state;
   selecting a fitting waveform corresponding to the touch state according to the touch state;
   wherein a method for obtaining the fitting waveform comprises:
      obtaining a touch simulation mechanical curve; and
      obtaining the fitting waveform of an electrical signal to be provided to the tactile feedback apparatus by fitting the touch simulation mechanical curve; and
   providing the electrical signal to the tactile feedback apparatus according to the fitting waveform, so as to enable the tactile feedback apparatus to vibrate;
   wherein the fitting waveform comprises a boundary tactile sense waveform;
   said obtaining the touch simulation mechanical curve comprises:
      obtaining, according to a preset boundary model, a touch simulation positive force changing curve as the touch simulation mechanical curve; and
   said obtaining the fitting waveform of the electrical signal to be provided to the tactile feedback apparatus by fitting the touch simulation mechanical curve comprises:
      obtaining the boundary tactile sense waveform by fitting the touch simulation positive force changing curve.

2. The method according to claim 1, wherein the boundary tactile sense waveform comprises:
   a boundary waveform corresponding to the touch simulation positive force changing curve; and
   a reverse stopping waveform behind the boundary waveform;
   wherein a phase of the reverse stopping waveform is opposite to a phase of the boundary waveform.

3. The method according to claim 2, wherein a frequency of the boundary waveform is greater than or equal to 200 Hertz and less than or equal to 800 Hertz.

4. The method according to claim 2, wherein:
   the method for obtaining the fitting waveform further comprises:
      obtaining acceleration changing data of a touch interface of the tactile feedback apparatus through acceleration test on the tactile feedback apparatus; and
   said obtaining the boundary tactile sense waveform by fitting the touch simulation positive force changing curve comprises:
      obtaining the boundary tactile sense waveform by fitting the touch simulation mechanical curve and the acceleration changing data.

5. The method according to claim 4, wherein the boundary tactile sense waveform further comprises:
   an overdrive waveform, prior to the boundary waveform and corresponding to the acceleration changing data;
   wherein a frequency of the overdrive waveform is greater than a frequency of the boundary waveform.

6. The method according to claim 5, wherein the frequency of the overdrive waveform is greater than or equal to 2000 Hertz and less than or equal to 6000 Hertz.

7. The method according to claim 5, wherein a duration of the overdrive waveform is greater than 0 and less than or equal to 5 milliseconds, a duration of the boundary waveform is greater than or equal to 10 milliseconds and less than or equal to 30 milliseconds, and a duration of the reverse stopping waveform is greater than or equal to 1 millisecond and less than or equal to 5 milliseconds.

8. The method according to claim 4, wherein a voltage of the boundary tactile sense waveform is greater than or equal to −200 volts and less than or equal to 200 volts.

9. The method according to claim 1, wherein the fitting waveform further comprises a press tactile sense waveform;
   said obtaining the touch simulation mechanical curve comprises:
      obtaining a simulated contact force changing curve in a touch press process to serve as the touch simulation mechanical curve; and
   said obtaining the fitting waveform of the electrical signal to be provided to the tactile feedback apparatus by fitting the touch simulation mechanical curve comprises:
      obtaining the press tactile sense waveform by fitting the simulated contact force changing curve.

10. The method according to claim 9, wherein the press tactile sense waveform comprises:
    a first press waveform,
    a keeping waveform behind the first press waveform, and
    a second press waveform behind the keeping waveform;
    wherein a voltage amplitude of the first press waveform is greater than a voltage amplitude of the second press waveform.

11. The method according to claim 10, wherein:
    a quantity of duration periods of the first press waveform is greater than or equal to 30 and less than or equal to 50,
    a duration of the keeping waveform is greater than or equal to 60 milliseconds and less than or equal to 200 milliseconds, and
    a quantity of duration periods of the second press waveform is greater than or equal to 5 and less than or equal to 20.

12. The method according to claim 9, wherein:
    said determining the touch state comprises:
       determining a touch position; and
    said selecting the fitting waveform corresponding to the touch state according to the touch state comprises:
       when the touch position falls into a first preset area, selecting the boundary tactile sense waveform as the fitting waveform; and
       when the touch position falls into a second preset area, selecting the press tactile sense waveform as the fitting waveform.

13. The method according to claim 9, wherein:
said determining the touch state comprises:
  determining the touch position; and
  when the touch position falls into a third preset area, determining touch pressure; and
said selecting the fitting waveform corresponding to the touch state according to the touch state comprises:
  when the touch pressure is less than preset pressure, selecting the boundary tactile sense waveform as the fitting waveform; and
  when the touch pressure is greater than or equal to the preset pressure, selecting the press tactile sense waveform as the fitting waveform.

14. A tactile feedback apparatus, comprising:
a touch panel, comprising:
  a touch substrate, and
  at least one piezoelectric device on one side of the touch substrate; and
a drive chip, configured to provide an electrical signal to the piezoelectric device according to the tactile feedback method according to claim 1.

15. A touch display apparatus, comprising the tactile feedback apparatus according to claim 14.

16. A tactile feedback method, applied to a tactile feedback apparatus, comprising:
determining a touch state;
selecting a fitting waveform corresponding to the touch state according to the touch state;
wherein the fitting waveform comprises a press tactile sense waveform, a method for obtaining the fitting waveform comprises:
  obtaining a simulated contact force changing curve in a touch press process; and
  obtaining the press tactile sense waveform by fitting the simulated contact force changing curve; and
providing the electrical signal to the tactile feedback apparatus according to the fitting waveform, so as to enable the tactile feedback apparatus to vibrate.

17. The method according to claim 16, wherein the press tactile sense waveform comprises:
a first press waveform,
a keeping waveform behind the first press waveform, and
a second press waveform behind the keeping waveform;
wherein a voltage amplitude of the first press waveform is greater than a voltage amplitude of the second press waveform.

18. The method according to claim 17, wherein:
a quantity of duration periods of the first press waveform is greater than or equal to 30 and less than or equal to 50,
a duration of the keeping waveform is greater than or equal to 60 milliseconds and less than or equal to 200 milliseconds, and
a quantity of duration periods of the second press waveform is greater than or equal to 5 and less than or equal to 20.

* * * * *